April 26, 1932.    L. COOK    1,855,704
MEASURING INSTRUMENT
Filed Aug. 18, 1925    2 Sheets-Sheet 1

Inventor:
Lyman Cook,
by Emery, Booth, Janney & Varney
Attys.

April 26, 1932.  L. COOK  1,855,704
MEASURING INSTRUMENT
Filed Aug. 18, 1925   2 Sheets-Sheet 2
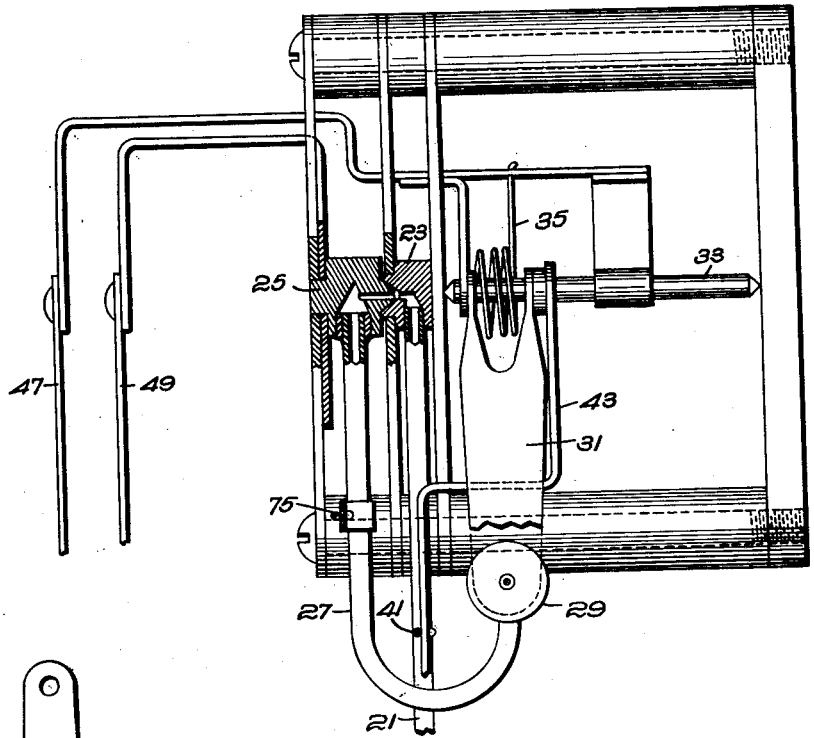
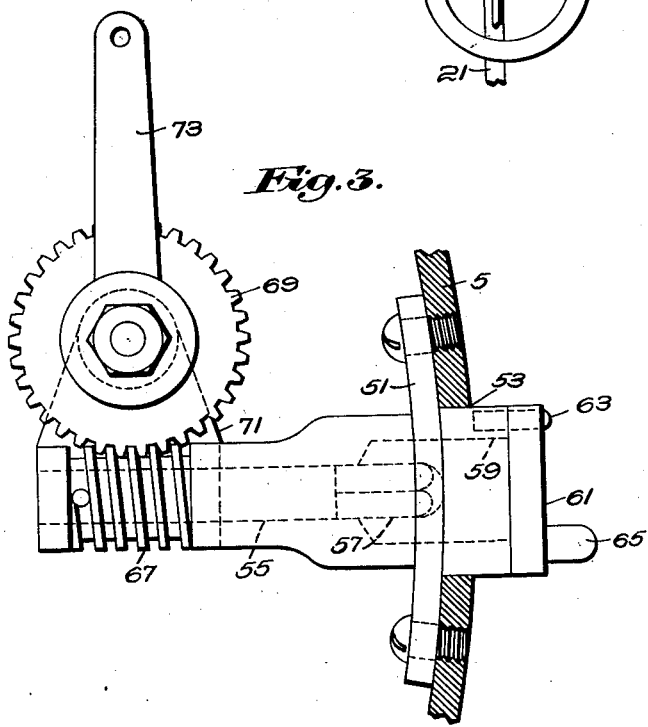
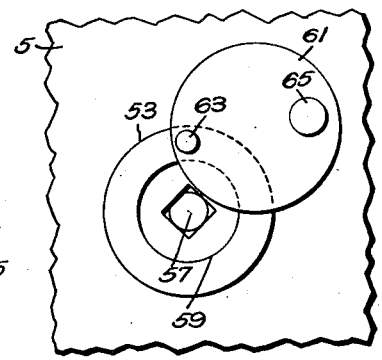
Inventor:
Lyman Cook,
by Emery, Booth, Janney & Varney
Attys.

Patented Apr. 26, 1932

1,855,704

UNITED STATES PATENT OFFICE

LYMAN COOK, OF FOXBORO, MASSACHUSETTS, ASSIGNOR TO THE FOXBORO COMPANY, OF FOXBORO, MASSACHUSETTS, A CORPORATION OF MASSACHUSETTS

MEASURING INSTRUMENT

Application filed August 18, 1925. Serial No. 50,914.

This invention relates to instruments responsive to the effect of some variable, as, for instance, temperature or pressure, of which pressure gages and pressure controllers constitute a well known type, and the object is to provide an efficient construction for effecting a desired adjustment of the mechanism of such an instrument and particularly one having a wide range of application and use.

The invention will be well understood from the illustration by way of example in the accompanying drawings of a combined controlling instrument and pressure gage constituting one embodiment thereof and explained in detail in the following description. In the drawings:

Fig. 2 is a view on an enlarged scale of the governing mechanism which appears at the upper left hand portion of Fig. 1 as seen from the right of Fig. 1 and with parts in section;

Fig. 3 is an enlarged side elevation of the adjusting device which appears at the right of Fig. 1; and Fig. 4 is a fragmentary view of the exterior of the case of the instrument disclosing part of the structure of Fig. 3 as seen from the right in that figure.

Figure 1:
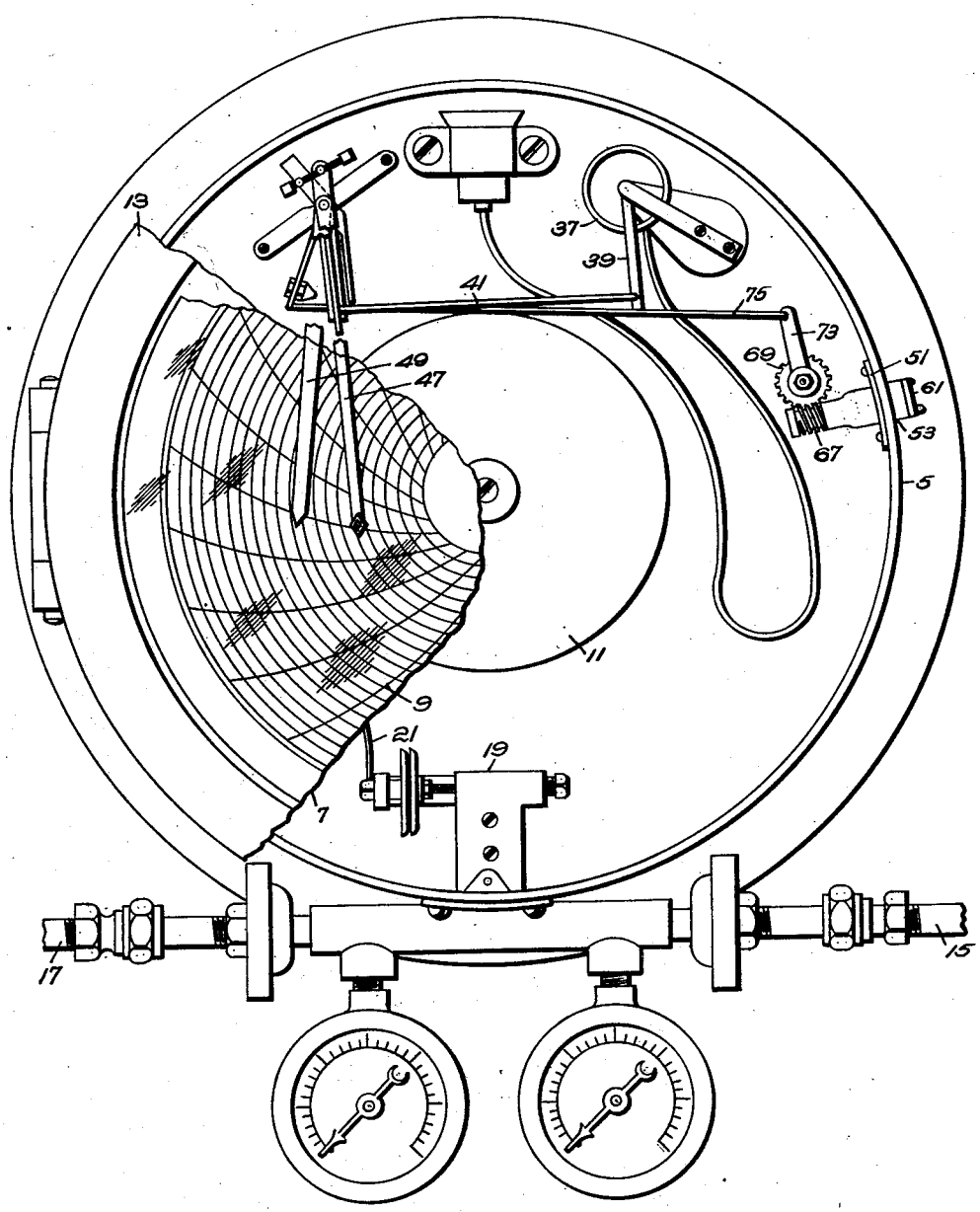
Fig. 1 is a front elevation of a recording gage and controlling instrument with parts broken away to disclose the interior construction.

The instrument herein shown is organized in a case having a cylindrical wall 5, at the outer extremity of which is supported a dial plate 7 on which rests a paper chart 9 of conventional form which is rotated over the dial plate by the clock movement 11. The case is provided with a glazed door 13 through which the chart 9 may be inspected. This structure is a customary one in recording instruments. The instrument shown is a controller by which the passage of fluid from the pipe 15 to the pipe 17 may be controlled through the agency of a control head or servo-motor 19 which may be constructed and operated substantially as described in Patent 1,326,640, dated Dec. 30, 1919, to Edgar H. Bristol, and which need not herein be described in detail. At the upper left hand portion of Fig. 1 and Fig. 2 are shown the control elements, herein a pair of valve elements, which operate the servo-motor or control head 19. The construction shown in Fig. 2 embodies various features of construction more fully described and claimed in a patent to Arnold M. Dixon, No. 1,582,868, dated April 27, 1926. The control head 19 is in communication through a pipe 21 with a hollow bearing member 23 which in turn communicates with a hollow shaft 25 which carries at the end of the tubular arm or pipe 27 a ported member 29. Pressure fluid from the control head may pass through pipe 21, the hollow members 23 and 25 and pipe 27 and bleed or escape to atmosphere through the ported member 29 except when this port is covered by a valve 31, herein shown as loosely swinging about a shaft 33 coaxial with the shaft 25 with which the ported member 29 swings and normally urged to seated position by a light spring 35.

The valve element 31 may be moved in accordance with a suitable variable, for instance pressure, which may operate on a responsive element 37 (see Fig. 1) which conveniently takes the form of a helical tube of the type shown and described in Patent 1,195,334, dated August 22, 1916, to Edgar H. Bristol. This responsive element may conveniently be disposed at a portion of the case remote from the control element shown in Fig. 2 and may operate through a crank arm 39 connected by a link or connecting rod 41 to a crank arm 43 secured to shaft 33 and disposed at the further side of the valve 31. It will be clear that the crank 43, if swung toward the reader in Fig. 2, will lift the valve 31 away from co-operating valve element 29 against the force of the spring 35 and as it swings away from the reader under the influence of the responsive element, it will permit the valve 31 to be seated. The construction permits continued motion of the crank arm 43 away from the reader in Fig. 2 or toward the left in Fig. 1 after the valve is seated and herein the shaft 33 which is rotated by the crank carries a pen 47 cooperating with the chart 9. The construction described permits the pen to record the actual value of the variable affecting the responsive element 37 irrespective of the engagement of the valve elements.

The position of the hollow member 25 and consequently of the valve element 29 may be made manifest by means of a suitable index and scale and herein there is shown a pointer 49 carried by said element 25 and adapted to cooperate with the scale on the chart 9. Such a pointer can be used as a handle for manually adjusting the control mechanism. In accordance with the present invention other means are provided for effecting this adjustment which avoid the inconvenience of moving this element, which normally lies under or closely adjacent the pen 47, by the fingers and which permit the adjustment to be made without opening the door 13.

Herein is shown an adjusting mechanism housed within the casing of the instrument but accessible from in front of the same, for instance, when the instrument is attached to a vertical wall or gage board, and in a position away from the door. Herein the mechanism is accessible through the cylindrical side wall of the case and is operated by means of a suitable key.

To avoid crowding and for other reasons which will appear the operating mechanism for effecting the adjustment may be located at a relatively remote point of the case from the control elements and the motion transmitted thereto through a suitable connection. Herein the adjusting mechanism proper is organized as a unitary structure and may comprise (see Fig. 3) a suitable frame element having a base 51 adapted to fit the interior of the cylindrical wall of the case and be secured thereto, this base having an enlargement 53 which may project through the side wall. Projecting from the other side of the base is a substantially radial extension providing bearings for a shaft 55 having a squared end 57 projecting into the recess 59 formed in the enlargement 53, the squared end of the shaft as shown preferably terminating within the circumference of the case 5. A key similar in construction to a socket wrench may be inserted in the recess 59 to turn the shaft. The recess may be normally covered at the exterior of the instrument by means of a cover plate 61 pivoted on an escutcheon pin 63 and provided with a knob or handle 65. Obviously suitable means for locking the cover plate could be provided if desired or necessary.

Pinned to shaft 55 is a worm 67 and a cooperating worm wheel 69 is mounted on an arm 71 extending laterally from the frame member in which the bearings of the shaft 55 are provided. The worm wheel 69 when turned serves swingably to adjust control valve element 29, and herein turns arm 73 which (see Fig. 1) through the medium of a connecting rod or link 75 acts on the control valve element through a suitable crank arm, the connecting rod 75 being herein connected at a suitable point along the pipe 27, as shown in Fig. 2. It will be clear that when the shaft 55 is turned by means of a suitable key, a slow motion will be communicated to the worm wheel and the valve element 29 will be thereby adjusted. The amount of this adjusting movement may be observed without obstruction by movement of the index 49 over the scale of the chart 9. The worm and worm wheel also serve to lock the control element in the desired adjusted position since a worm cannot be driven by its wheel.

It will be noted that the adjusting mechanism, as shown in Fig. 3, is organized as a unit and both in itself and in its manner of connection to the control device embodies merely simple rotative bearings. In accordance with the exigencies of use the mechanism may be assembled with instruments of widely different design and positioned within the case where opportunity offers, it only being required that the connection means such as the connecting rod 75 will clear other mechanisms, as, for instance, the clock movement 11. Furthermore, in the case of a connecting rod, this need not necessarily be straight but can be laterally bent, if necessary, to clear other parts. The assembly of the mechanism in the case is at a point remote from other delicate mechanisms and it is positioned as a complete unit and can be withdrawn for replacement and repair very simply and without disturbance of other parts of the instrument.

I have described in detail the particular instrument herein shown as an embodiment of the invention and the particular arrangement of mechanical parts as applied thereto. The particularity of this description has been for the purpose of making the illustrated construction well understood and not because the scope of the invention is limited to the construction illustrated. On the contrary it may be widely varied and what I claim as new and desire to secure by Letters Patent I shall express in the following claims.

Claims:

1. In an instrument of the class described in combination with relatively movable control elements adapted to engage one with the other to effect the desired action, a motor device, responsive to a variable operatively connected to one of said elements to move the same consonantly to the fluctuations of said variable and means for varying the position of the other element comprising a worm wheel connected thereto and a manually operable worm meshing therewith for driving the same.

2. In an instrument of the class described in combination with a pair of coaxially pivoted, swingable control elements adapted to engage one with the other to effect the desired action, a motor device responsive to a variable for swinging one of said elements to move the same consonantly to fluctuations of said variable and means for swinging the other element comprising a connecting rod, a remote worm wheel providing a crank operating on said rod and a manually operable worm for driving the same.

3. In an instrument having a case and a dial, a bodily rotatable operating element within the case, an index cooperating with the dial and connected to said element, means for rotating said element comprising a connecting rod extending therefrom to a remote part of the case and an irreversible train of mechanism for moving said rod, said train including a driver accessible from the exterior of the case.

4. In an instrument having a case with a cylindrical wall, a shiftable operating element received in the case, an adjusting mechanism comprising a frame having a base to fit the wall, an enlargement on the base extending generally radially to be received in an opening in said wall, said frame providing bearings receiving a generally radially disposed worm and having a portion supporting a cooperating worm wheel, and link-work between said wheel and said element for moving the latter from the former.

5. In an instrument of the class described having a case and a dial, coaxially pivoted members in the case, control elements operatively associated with said members to move therewith and adapted to engage one with the other to effect the desired action, indices carried by said members respectively cooperating with the dial, a motor device responsive to a variable for moving one of said members to move the same consonantly to fluctuations of said variable and means for adjusting the position of said other member comprising an operating element accessible from the exterior of the case from a position in front of the same and located away from the dial.

6. In an instrument of the class described having a case, a dial and a glazed cover overlying the dial, movably mounted control elements in the case adapted to engage one with the other to effect the desired action, a motor device responsive to a variable for moving one of said elements to move the same consonantly to fluctuations of said variable, an index cooperating with said dial and connected to the other of said elements and means for moving the other element comprising an operating mechanism disposed in a remote portion of the case and a connecting rod between said element and operating mechanism connected to the former through a suitable crank arm, said mechanism being accessible for operation without moving the cover.

7. In an instrument of the class described having a case, a dial and a glazed cover overlying the dial, movably mounted control elements in the case adapted to engage one with the other to effect the desired action, a motor device responsive to a variable for moving one of said elements to move the same consonantly to fluctuations of said variable, an index cooperating with said dial and connected to the other of said elements and means for moving the other element comprising an operating mechanism disposed in a remote portion of the case and accessible for operation through a wall of the case, and a connector between said element and said mechanism.

8. In an instrument of the class described having a case, control elements adapted to engage one with the other to effect the desired action and pivoted generally coaxially on a line extending from front to back of the case, a device responsive to a variable disposed in a remote portion of the case and connected to one such element through a suitable crank arm to move the same consonantly to fluctuations of said variable, a turning element pivoted in a remote portion of the case and connected to the other element through a suitable crank arm and a driver for turning said element accessible for manipulation from the exterior of the case.

In testimony whereof, I have signed my name to this specification.

LYMAN COOK.